(12) United States Patent
Miller et al.

(10) Patent No.: US 10,107,200 B2
(45) Date of Patent: Oct. 23, 2018

(54) TURBINE ENGINE THERMAL MANAGEMENT

(71) Applicant: General Electric Company, Schenectady, NY (US)

(72) Inventors: Brandon Wayne Miller, Cincinnati, OH (US); Jeffrey Glover, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 14/700,172

(22) Filed: Apr. 30, 2015

(65) Prior Publication Data
US 2016/0319748 A1    Nov. 3, 2016

(51) Int. Cl.
*F02C 1/00* (2006.01)
*F02C 7/18* (2006.01)
(Continued)

(52) U.S. Cl.
CPC ............... *F02C 7/18* (2013.01); *F01D 25/14* (2013.01); *F01D 25/24* (2013.01); *F02C 3/04* (2013.01); *F02C 7/14* (2013.01); *F02C 9/18* (2013.01); *F02K 3/075* (2013.01); *F05D 2220/32* (2013.01); *F05D 2260/213* (2013.01);
(Continued)

(58) Field of Classification Search
USPC ......... 60/726, 728, 730, 756, 757, 758, 805, 60/806, 39.83; 415/177, 178, 179
See application file for complete search history.

(56) References Cited

U.S. PATENT DOCUMENTS

| 3,302,397 A | 2/1967 | Davidovic |
| 3,978,660 A | 9/1976 | Laing |

(Continued)

FOREIGN PATENT DOCUMENTS

| CN | 103511124 A | 1/2014 |
| EP | 0511770 A1 | 11/1992 |

(Continued)

OTHER PUBLICATIONS

Notification of Reasons for Refusal issued in connection with corresponding JP Application No. 2016-086660 dated Apr. 25, 2017.

(Continued)

*Primary Examiner* — Binh Q Tran
(74) *Attorney, Agent, or Firm* — General Electric Company; Pamela Kachur

(57) ABSTRACT

A gas turbine engine including core engine is provided. Air may enter the core engine through an inlet and travel through and engine air flowpath extending through the core engine, e.g., generally along an axial direction of the gas turbine engine. The gas turbine engine additionally includes a cooling air flowpath extending outwardly generally along the radial direction of the gas turbine engine. The cooling air flowpath extends between an inlet in flow communication with engine air flowpath and an outlet defined by an opening in an outer casing of the core engine. Moreover, the gas turbine engine includes a heat exchanger positioned at least partially within the outer casing the core engine with the cooling air flowpath extending over or through the heat exchanger.

20 Claims, 4 Drawing Sheets

(51) Int. Cl.
*F02K 3/075* (2006.01)
*F02C 7/14* (2006.01)
*F02C 9/18* (2006.01)
*F01D 25/14* (2006.01)
*F01D 25/24* (2006.01)
*F02C 3/04* (2006.01)

(52) U.S. Cl.
CPC .... *F05D 2260/98* (2013.01); *F05D 2270/101* (2013.01); *Y02T 50/671* (2013.01); *Y02T 50/676* (2013.01)

(56) References Cited

U.S. PATENT DOCUMENTS

| | | | |
|---|---|---|---|
| 4,546,605 A | 10/1985 | Mortimer et al. | |
| 4,550,562 A * | 11/1985 | Rice | F01K 23/10 60/728 |
| 5,100,291 A * | 3/1992 | Glover | F01D 11/24 165/169 |
| 6,422,020 B1 | 7/2002 | Rice | |
| 9,038,398 B2 * | 5/2015 | Suciu | F01D 5/081 184/6.11 |
| 9,200,855 B2 * | 12/2015 | Kington | F02C 7/10 |
| 2012/0114468 A1 | 5/2012 | Elder | |
| 2012/0128467 A1 | 5/2012 | Ruthemeyer | |
| 2013/0239588 A1 * | 9/2013 | Suciu | F02C 7/14 60/806 |
| 2014/0090395 A1 * | 4/2014 | Appukuttan | F02C 7/185 60/776 |
| 2014/0096534 A1 | 4/2014 | Snape et al. | |
| 2014/0182264 A1 | 7/2014 | Weisgerber et al. | |
| 2014/0216056 A1 | 8/2014 | Schwartz et al. | |
| 2014/0290272 A1 * | 10/2014 | Mulcaire | F01D 25/12 60/806 |

FOREIGN PATENT DOCUMENTS

| | | |
|---|---|---|
| EP | 2653699 A2 | 10/2013 |
| FR | 2552163 A1 | 3/1985 |
| JP | S60-153432 A | 8/1985 |
| JP | H06-504602 A | 5/1994 |
| WO | 2014/051678 A1 | 4/2014 |
| WO | 2014151685 A1 | 9/2014 |

OTHER PUBLICATIONS

First Office Action and Search issued in connection with corresponding CN Application No. 201610276117.1 dated Apr. 28, 2017.
European Search Report and Opinion issued in connection with corresponding EP Application No. 16167564.0 dated Sep. 30, 2016.

* cited by examiner

TURBINE ENGINE THERMAL MANAGEMENT

FIELD OF THE INVENTION

The present subject matter relates generally to a thermal management system for a turbine engine.

BACKGROUND OF THE INVENTION

A gas turbine engine generally includes a core having, in serial flow order, a compressor section, a combustion section, a turbine section, and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere.

In particular configurations, the gas turbine engine additionally includes a fan surrounded by an annular casing and positioned in flow communication with the core. The annular casing can define a bypass passage with the core. With such a configuration, a first portion of the air from the fan is provided to an inlet of the core and a second portion of the air from the fan is routed around the core through the bypass passage. In certain embodiments, bypass air from the bypass passage can subsequently be routed into the core downstream of the inlet and used as a cooling medium for one or more heat exchangers. Specifically, the core of the gas turbine engine can include one or more heat exchangers positioned therein for removing heat from, e.g., lubrication oil used in the operation of the gas turbine engine. With such a configuration, the core draws bypass air in from the bypass passage, over or into the one or more heat exchangers, and then exhausts the air back into the bypass passage.

With such a configuration, however, the one or more heat exchangers can occupy a relatively large amount of space in the core, increasing a size of the core. Efforts to increase an efficiency of the gas turbine engine, however, call for a reduction in the size of the core. Accordingly, a gas turbine engine having a reduced core size while maintaining one or more heat exchangers would be beneficial. More particularly, a gas turbine engine having one or more heat exchangers configured to occupy less space in the core would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure a gas turbine engine is provided. The gas turbine engine defines a radial direction and includes a core engine including an outer casing and an engine air flowpath extending through the core engine. The gas turbine engine additionally includes a cooling air flowpath extending outwardly generally along the radial direction between an inlet in flow communication with the engine air flowpath and an outlet defined by an opening in the outer casing of the core engine. Additionally, the gas turbine engine includes a heat exchanger positioned at least partially within the outer casing of the core engine, the cooling air flowpath extending over or through the heat exchanger.

In another exemplary embodiment of the present disclosure a gas turbine engine is provided defining a radial direction and a circumferential direction. The gas turbine engine includes a core engine including an outer casing and a compressor section. The gas turbine engine also includes an engine air flowpath extending through the compressor section of the core engine. The gas turbine engine also includes a plurality of bleed air flowpaths extending outwardly generally along the radial direction from the engine air flowpath. The gas turbine engine also includes a cooling air flowpath extending outwardly generally along the radial direction from the engine air flowpath, the cooling air flowpath and the plurality of bleed air flowpaths spaced along the circumferential direction of the gas turbine engine. The gas turbine engine also includes a heat exchanger positioned at least partially within the outer casing of the core engine, the cooling air flowpath extending over or through the heat exchanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
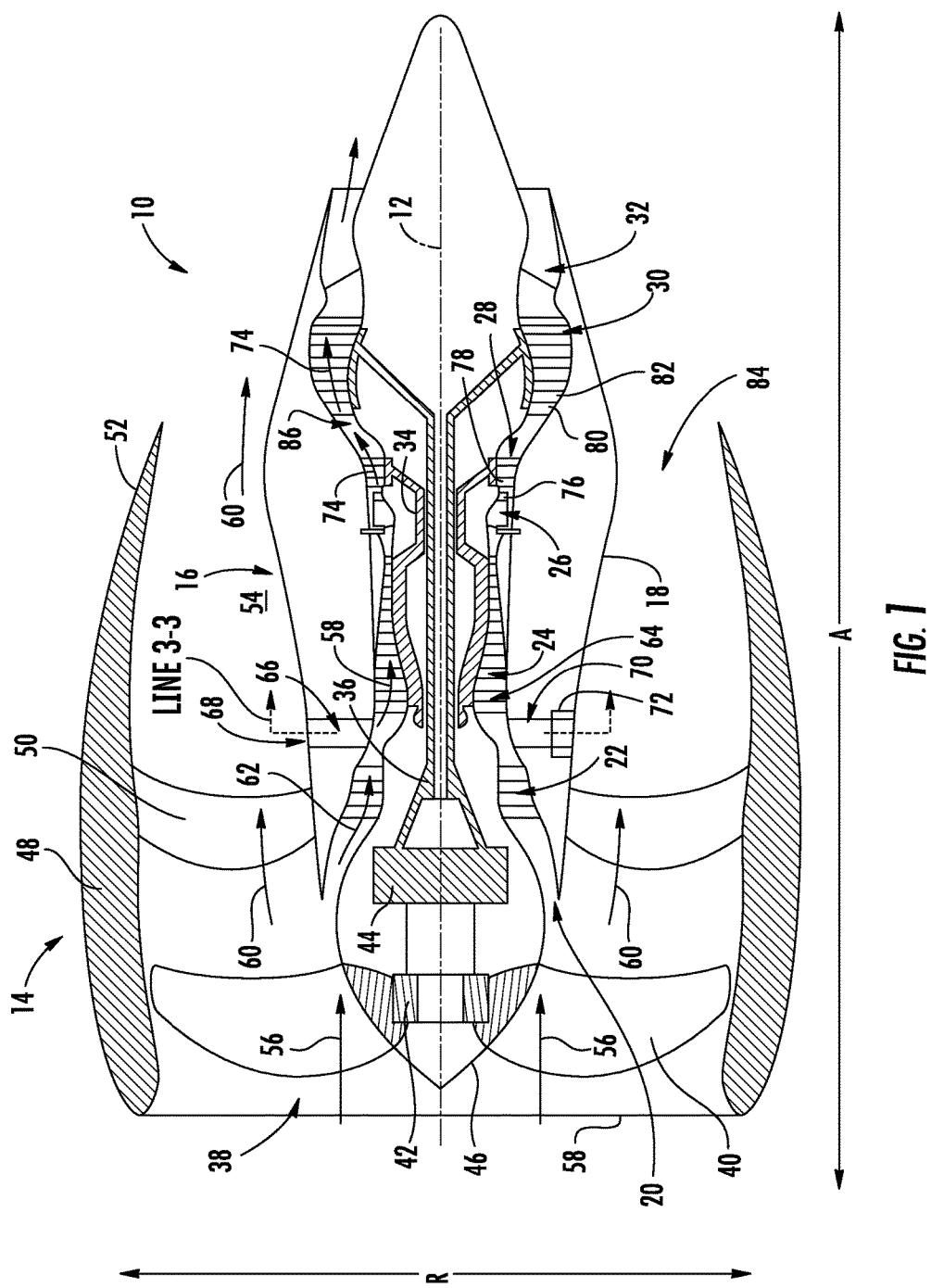
FIG. 1 is a schematic cross-sectional view of a gas turbine engine according to an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG.

1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C. In general, the turbofan 10 includes a fan section 14 and a core engine 16 disposed downstream from the fan section 14.

The exemplary core engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal centerline 12 by LP shaft 36 across a power gear box 44. The power gear box 44 includes a plurality of gears for stepping down the rotational speed of the LP shaft 36 to a more efficient rotational fan speed. Additionally, for the embodiment depicted, the disk 42 of the variable pitch fan 38 is covered by a rotatable front hub 46 aerodynamically contoured to promote an airflow through the plurality of fan blades 40.

Referring still to the exemplary turbofan engine 10 of FIG. 1, the exemplary fan section 14 additionally includes an annular fan casing or outer nacelle 48 that circumferentially surrounds the fan 38 and/or at least a portion of the core engine 16. For the embodiment depicted, the outer nacelle 48 is supported relative to the core engine 16 by a plurality of circumferentially-spaced outlet guide vanes 50. Moreover, a downstream section 52 of the outer nacelle 48 extends over the outer casing 18 of the core engine 16 so as to define a bypass airflow passage 54 therebetween.

During operation of the turbofan engine 10, a volume of air 56 enters the turbofan 10 through an associated inlet 58 of the outer nacelle 48 and/or fan section 14. As the volume of air 56 passes across the fan blades 40, a first portion of the air as indicated by arrows 60 is directed or routed into the bypass airflow passage 54 and a second portion of the air as indicated by arrow 62 is directed or routed into an engine air flowpath 64 extending through the compressor section, the combustion section 26, the turbine section, and the exhaust section 32. The ratio between the first portion of air 60 and the second portion of air 62 is commonly known as a bypass ratio. The pressure of the second portion of air 62 is increased as it is routed through the LP compressor 22 and subsequently through the HP compressor 24.

The turbofan engine 10 additionally includes a plurality of bleed air flowpaths 66 within the core engine 16 extending outwardly generally along the radial direction R from the engine air flowpath 64. More particularly, for the embodiment depicted, the plurality of bleed air flowpaths 66 are in flow communication with the engine air flowpath 64 at a location downstream from the LP compressor 22 and upstream from the HP compressor 24. The plurality of bleed air flowpaths 66 are configured to selectively allow a flow of air from the engine air flowpath 64 to an outlet 68 defined by the outer casing 18 of the core engine 16. Accordingly, the plurality of bleed air flowpaths 66 may exhaust air overboard, which for the embodiment depicted is into the bypass airflow passage 54. Such a configuration may assist in preventing a stall of the LP compressor 22 under certain operating conditions.

Moreover, as will be discussed in greater detail below with reference to FIGS. 2 through 4, for the exemplary embodiment depicted, the turbofan engine 10 additionally includes at least one cooling air flowpath (referred to generally as 70) also extending outwardly generally along the radial direction R from the engine air flowpath 64 to an outlet 68. Moreover, the turbofan engine 10 includes at least one heat exchanger (referred to generally as 72) positioned at least partially within the outer casing 18 of the core engine 16 such that the cooling air flowpath(s) 70 extends over or through the respective heat exchanger 72 generally along the radial direction R. As used herein, the term "over or through" with respect to a heat exchanger 72 refers to an airflow therethrough being in thermal communication with the heat exchanger 72. As will the plurality of bleed air flowpaths 66, the at least one cooling air flowpath 70 and heat exchanger 72 positioned at least partially therein may therefore exhaust air overboard, which for the embodiment depicted is into the bypass airflow passage 54. Accordingly, an airflow through the cooling air flowpath(s) 70 may serve a dual function of bleeding air from the engine air flowpath 64 between the LP compressor 22 and HP compressor 24 as well as removing heat from a respective heat exchanger 72. As will be discussed below, the cooling air flowpath(s) 70 and the plurality of bleed air flowpaths 66 are spaced along the circumferential direction C of the turbofan engine 10.

Referring still to FIG. 1, the compressed second portion of air 62 is then provided to the combustion section 26, where it is mixed with fuel and burned to provide combustion gases 74. The combustion gases 74 are routed through the HP turbine 28 where a portion of thermal and/or kinetic energy from the combustion gases 74 is extracted via sequential stages of HP turbine stator vanes 76 that are coupled to the outer casing 18 and HP turbine rotor blades 78 that are coupled to the HP shaft or spool 34, thus causing the HP shaft or spool 34 to rotate, thereby supporting operation of the HP compressor 24. The combustion gases 74 are then routed through the LP turbine 30 where a second portion of thermal and kinetic energy is extracted from the combustion gases 74 via sequential stages of LP turbine stator vanes 80 that are coupled to the outer casing 18 and LP turbine rotor blades 82 that are coupled to the LP shaft or spool 36, thus causing the LP shaft or spool 36 to rotate, thereby supporting operation of the LP compressor 22 and/or rotation of the fan 38.

The combustion gases 74 are subsequently routed through the jet exhaust nozzle section 32 of the core engine 16 to provide propulsive thrust. Simultaneously, the pressure of the first portion of air 60 is substantially increased as the first portion of air 60 is routed through the bypass airflow passage 54 before it is exhausted from a fan nozzle exhaust section 84 of the turbofan 10 also providing propulsive thrust. The HP turbine 28, the LP turbine 30, and the jet exhaust nozzle section 32 at least partially define a hot gas path 86 for routing the combustion gases 74 through the core engine 16.

Figure 2:
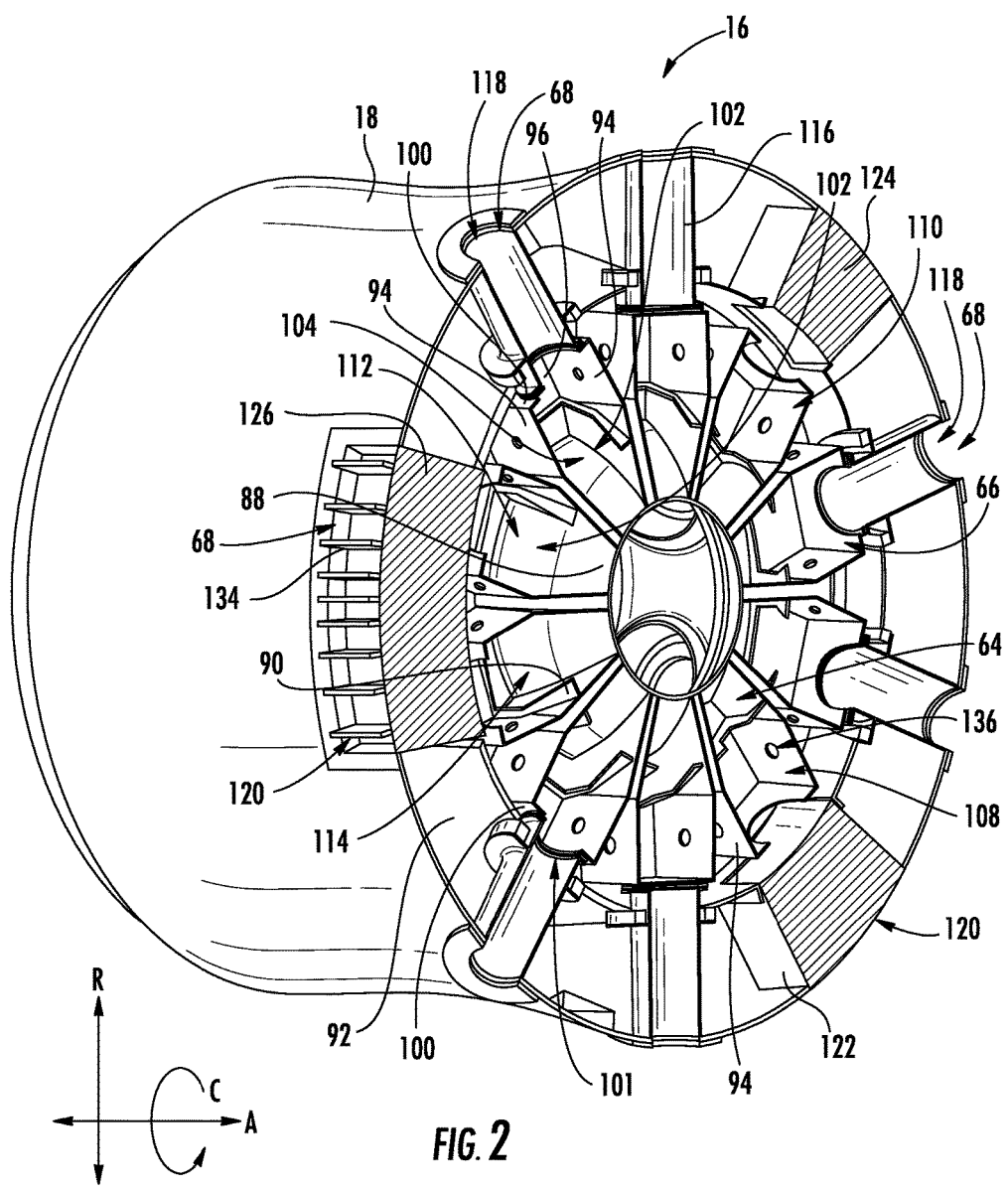
FIG. 2 is a perspective, cross-sectional view of a portion of a compressor section of the gas turbine engine of FIG. 1.
Figure 3:
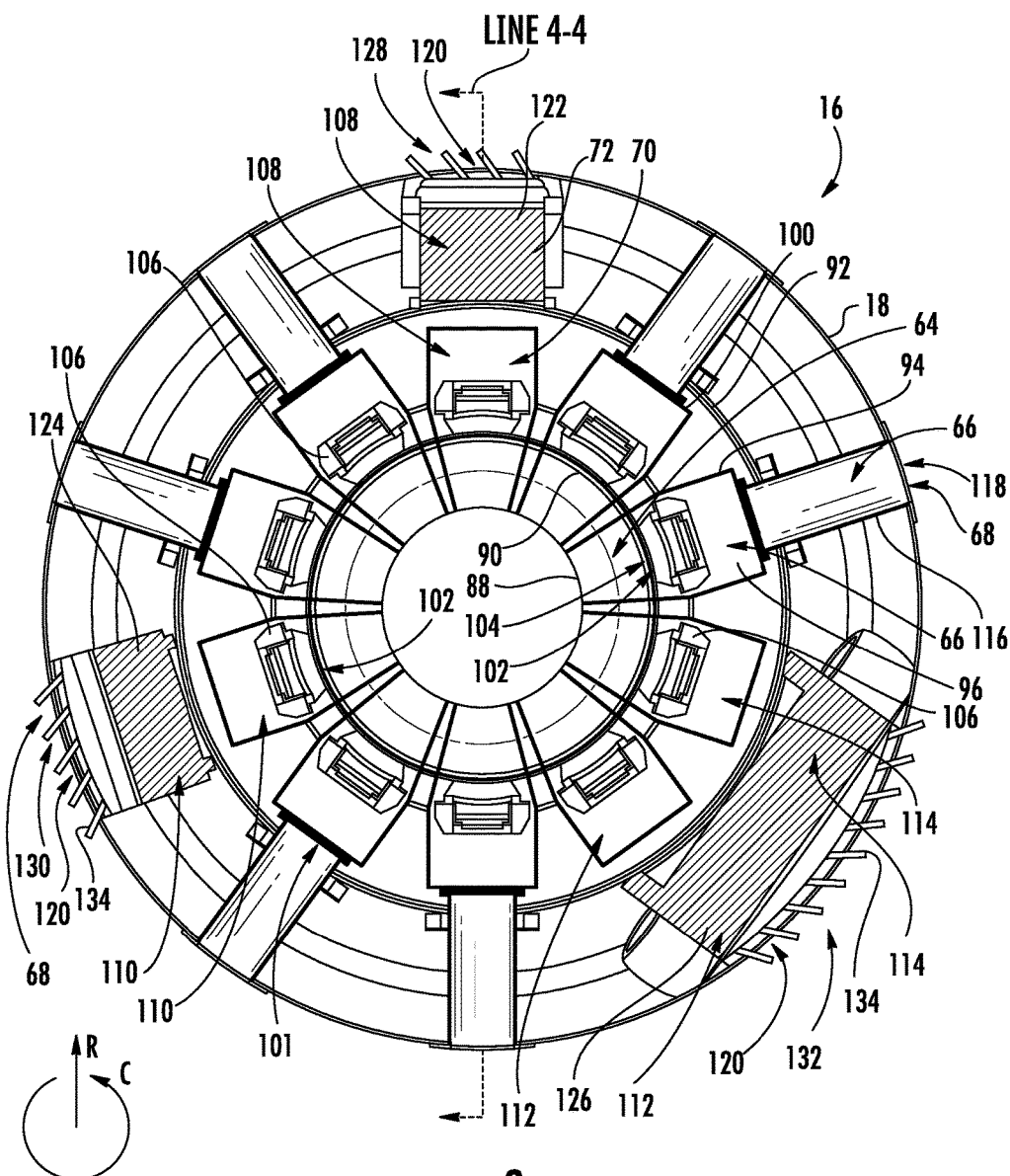
FIG. 3 is a cross-sectional view of a portion of the compressor section of the gas turbine engine of FIG. 1, taken along Line 3-3 in FIG. 1.
Figure 4:
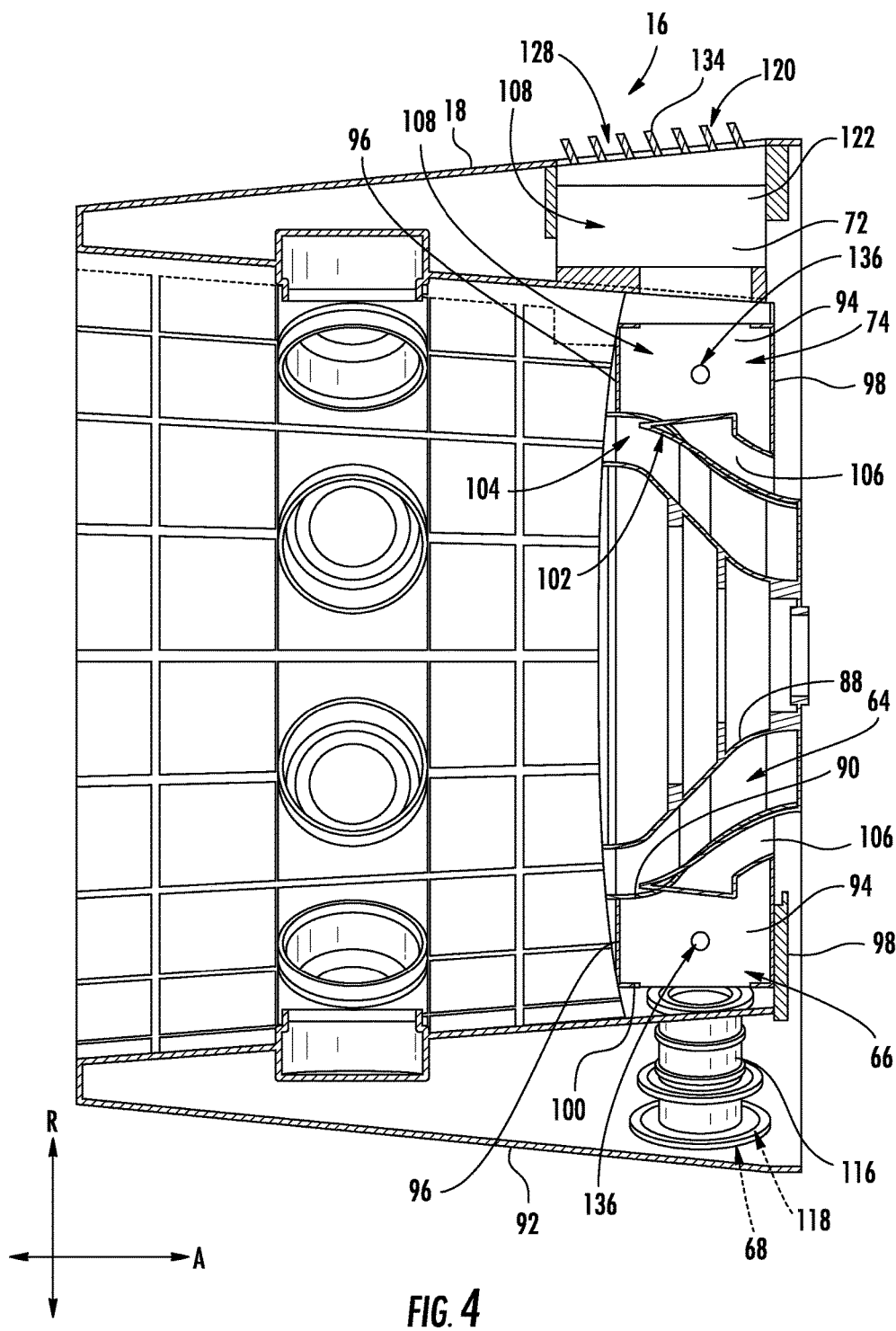
FIG. 4 is a cross-sectional view of a portion of the compressor section of the gas turbine engine of FIG. 1, taken along Line 4-4 in FIG. 3.

Referring now to FIGS. 2 through 4, perspective and cross-sectional views are provided of the cooling air flowpath(s) 70 and bypass air flowpaths 64 of the turbofan engine 10 of FIG. 1. More particularly, FIG. 2 provides a perspective cross-sectional view of a portion of the compressor section of the turbofan engine 10 of FIG. 1; FIG. 3 provides a cross-sectional view of a portion of the compressor section of the turbofan engine 10 FIG. 1, taken along Line 3-3 of FIG. 1; and FIG. 4 provides a cross-sectional view of a portion of the compressor section of the turbofan engine 10 of FIG. 1, taken along Line 4-4 of FIG. 3.

As shown, the core engine 16 includes an inner liner 88 and an outer liner 90 spaced from one another along the radial direction R. The inner and outer liners 88, 90 at least partially define the engine air flowpath 64. Additionally, between the outer liner 90 and the outer casing 18 of the core engine 16 is an annular frame 92 extending along the circumferential direction C around the liners 88, 90 and providing structural support to the compressor section of the core engine 16. The annular frame 92 may in certain exemplary embodiments be an annular front compressor frame, or alternatively may be any other suitable frame extending circumferentially around the liners 88, 90. The core engine 16 additionally includes a plurality of walls extending outwardly generally along the radial direction R from the outer liner 90 (as well as between the outer liner 90 and inner liner 88) towards the annular frame 92. For the embodiment depicted, the plurality of walls are configured in boxed sets, with each boxed set of walls at least partially defining one of a plurality of radial flowpaths—the radial flowpaths including bleed air flowpaths 66 and the at least one cooling air flowpath(s) 70. As shown, the plurality of radial flowpaths are each spaced about the circumferential direction C and each extends outwardly generally along the radial direction R from the engine air flowpath 64. More particularly, each boxed set of walls includes a pair of sidewalls 94 extending generally along the axial and radial directions A, R, an upstream wall 96 extending generally along the circumferential and radial directions C, R, and a downstream wall 98 also extending generally along the circumferential and radial directions C, R (FIG. 4). Additionally, a top wall 100 is positioned over each boxed set of walls defining an opening 101 therein to allow a flow of air therethrough. It should be appreciated, however, that in other exemplary embodiments, the plurality of walls may not be configured in a boxed shape, and may instead be configured in any other suitable shape, such as a rectangular or cylindrical shape.

Each of the plurality of radial flowpaths includes an inlet 102 defined by an opening 104 in the outer liner 90 such that each of the radial flowpaths are in flow communication with the engine air flowpath 64 in the compressor section of the core engine 16. More particularly, as was also depicted in FIG. 1, each of the radial flowpaths are in in flow communication with the engine air flowpath 64 between the LP compressor 22 and the HP compressor 24. It should be appreciated, however, that in other exemplary embodiments, the radial flowpaths (including the bleed air flowpaths 66 and the at least one cooling air flowpath(s) 70) may additionally or alternatively be positioned elsewhere in the compressor section of the core engine 16.

An amount of air directed from the engine air flowpath 64 to the plurality of radial flowpaths through the respective inlets is adjusted by a variable bleed valve door 106 (FIGS. 3 and 4; not pictured in FIG. 2 for clarity) positioned over the opening 104 in the outer liner 90. More particularly, for the embodiment depicted, the opening 104 in the outer liner 90 defining the inlet 102 to a respective radial flowpath includes a variable bleed valve door 106 positioned over it. The variable bleed valve doors 106 are moveable between a closed position, wherein no air from the engine air flowpath 64 is diverted into the plurality of radial flowpaths, and an opened or partially opened position (FIG. 4), wherein at least a portion of the air from the engine air flowpath 64 is diverted into the plurality of radial flowpaths.

For the embodiment depicted, the plurality of radial flowpaths includes six (6) bypass air flowpaths 64 extending generally outwardly along the radial direction R and four (4) cooling air flowpaths 70 also extending outwardly generally along the radial direction R. More particularly, the plurality of cooling air flowpaths 70 includes a first cooling air flowpath 108, a second cooling air flowpath 110, a third cooling air flowpath 112, and a fourth cooling air flowpath 114. In other exemplary embodiments, however, the turbofan engine 10 may alternatively include any other suitable number or configuration of cooling air flowpaths 70 and bypass air flowpaths 64.

Referring still to FIGS. 2 through 4, core engine 16 additionally includes a plurality of tubular extensions 116 extending from the top walls 100 of the respective boxed sets to the outer casing 18 of the core engine 16. The tubular extensions 116 are configured to enclose the bleed air flowpaths 66 between the top wall 100 of the respective boxed set and the outer casing 18 of the core engine 16. Accordingly, for the embodiment depicted the bypass air flowpaths 64 extend from the inlet 102 defined by the opening 104 in the outer liner 90 to the outlet 68 defined by an opening 118 and the outer casing 18 of the core engine 16.

Additionally, the tubular extensions 116 are rigidly attached to the annular frame 92 as well as to the outer casing 18 of the core engine 16. Such a configuration allows the tubular extensions 116 to provide structural support between the outer casing 18 and the annular frame 92.

Further, for the embodiment depicted, each cooling air flowpath 70 similarly extends from a respective inlet 102 defined by a respective opening 104 in the outer liner 90 to a respective outlet 68 defined by a respective opening 120 in the outer casing 18 of the core engine 16. Moreover, the core engine 16 includes heat exchangers 72 positioned at least partially within the outer casing 18 of the core engine 16 with one or more of the cooling air flowpaths 70 extending therethrough. More particularly, the exemplary core engine 16 depicted includes a first heat exchanger 122 positioned at least partially within the outer casing 18 of the core engine 16, a second heat exchanger 124 positioned at least partially within the outer casing 18 of the core engine 16, and a third heat exchanger 126 positioned at least partially within the outer casing 18 of the core engine 16. The first, second, and third heat exchangers 122, 124, 126 may each be rigidly attached to the outer casing 18 of the core engine 16 and may also be rigidly attached to the annular frame 92 of the core engine 16. Accordingly, each of the first, second, and third heat exchangers 122, 124, 126 may, in certain exemplary embodiments, be configured to provide structural support between the outer casing 18 and the annular frame 92. Notably, in certain exemplary embodiments, the first heat exchanger 122 may be a variable frequency generator air cooled oil cooler, the second heat exchanger 124 may be a main lube air cooled oil cooler, and the third heat exchanger 72 may be an environmental control system pre-cooler.

Further, although not depicted, in certain exemplary embodiments the turbofan engine 10 may include one or more additional heat exchangers positioned adjacent to one or more of the heat exchangers 122, 124, 126 depicted. For example, in certain embodiments, an additional heat exchanger may be stacked adjacent to heat exchanger 122 along the axial direction A. With such a configuration, a portion of the airflow through the first cooling air flowpath 108 may be diverted over or through the additional heat exchanger into the bypass passage 54.

As stated, each of the cooling air flowpaths 108, 110, 112, 114 extend over or through at least one of the heat exchangers 122, 124, 126 to provide a relatively cool flow of air over or through the respective heat exchanger 122, 124, 126. For example, the first cooling air flowpath 108 extends over or through the first heat exchanger 122, the second cooling air flowpath 110 extends over or through the second heat exchanger 124, and the third and fourth cooling air flowpaths 112, 114 extend over or through the third heat exchanger 126. Accordingly, with such a configuration, the heat exchangers 122, 124, 126 serve a dual function of removing heat from, e.g., oil flowing therethrough, as well as providing structural support between the outer casing 18 of the core engine 16 and the annular frame 92 of the core engine 16. Similarly, an airflow through the cooling air flowpaths 108, 110, 112, 114 serves a dual function of removing heat from a respective heat exchanger 122, 124, 126 as well as bleeding air from the compressor section of the core engine 16. Notably, the airflow provided through the cooling air flowpaths 108, 110, 112, 114 would need to be bled regardless of whether or not such air were provided through a respective heat exchanger 122, 124, 126. Accordingly, the configuration disclosed herein may provide for a more efficient turbofan engine 10 as the otherwise wasted "bleed" airflow may now be used to cool one or more of the heat exchangers 122, 124, 126.

A turbofan engine 10 having such a configuration may allow for a reduced diameter of the core engine 16 as room is not occupied by the additional structural components of the compressor section of the core engine 16 or by the heat exchangers 122, 124, 126 elsewhere in the core engine 16. By reducing an outer diameter of the core engine 16, an overall efficiency of the turbofan engine 10 may be increased as an amount of drag on the core engine 16 and a weight of the core engine 16 may each be reduced. Further, the above configuration may allow for increased maintainability as the complexity of component packaging within the core engine 16 may also be reduced.

Referring still to FIGS. 2 through 4, the core engine 16 additionally includes a vent positioned over one or more of the openings 120 in the outer casing 18 defining the outlets 68 of the cooling air flowpaths 108, 110, 112, 114. More specifically, for the embodiment depicted, the core engine 16 includes a first vent 128 over the opening 120 defining the outlet 68 of the first cooling air flowpath 108, a second vent 130 over the opening 120 defining the outlet 68 of the second cooling air flowpath 110, and a third vent 132 over the opening 120 defining the outlet 68 of the third and fourth cooling air flowpaths 112, 114. Each of the vents 128, 130, 132 include a plurality of slots 134 rotatable about a longitudinal centerline to adjust an amount of airflow allowable through the outlet 68 of a respective cooling air flowpath 108, 110, 112, 114. For example, each of the vents 128, 130, 132 may be moveable between a fully closed position, wherein the airflow allowable through the outlet 68 of a respective cooling air flowpath 108, 110, 112, 114 is reduced by about one hundred percent (100%), a partially closed position, wherein the airflow allowable through the outlet 68 of a respective cooling air flowpath 108, 110, 112, 114 is reduced by fifty percent (50%), and a fully open position, wherein the airflow allowable through the outlet 68 of a respective cooling air flowpath 108, 110, 112, 114 is reduced by about zero (0%). As used herein, terms of approximation such as "about" refer to being within a ten percent (10%) margin of error. It should be appreciated, however, that in other exemplary embodiments, the vents 128, 130, 132 may have any other suitable configuration for adjusting an amount of airflow allowable through the outlets 68 of the respective cooling airflow paths 108, 110, 112, 114.

Notably, with such a configuration, the various cooling air flowpaths 108, 110, 112, 114 may be in flow communication so as to not disrupt a pressure distribution of the airflow in the engine air flowpath 64 (e.g., along the circumferential direction C between the LP compressor 22 and the HP compressor 24). More specifically, for the embodiment depicted, each sidewall 94 in the boxed set of walls extending outwardly generally along the radial direction R defines an opening 136 allowing for air to flow between the cooling air flowpaths 108, 110, 112, 114 and one or more of the bleed air flowpaths 66. More particularly, the openings 136 defined in each of the plurality of radially extending sidewalls 94 forms an annular plenum of air (i.e., bleed supply air) between the outer liner 90 and the annular frame 92.

Although not depicted, in other exemplary embodiments, similar vents may be positioned over one or more of the openings 118 in the outer casing 18 of the core engine 16 defining the outlets 68 of the bleed air flowpaths 66. Such a configuration may allow the core engine 16 to focus the air from the annular plenum of air into one or more of the cooling air flowpaths 108, 110, 112, 114 and over or through certain of the heat exchangers 122, 124, 126 when, e.g., a large amount of cooling is required. It should be appreciated, however, that in other exemplary embodiments, one or more of the plurality of sidewalls 94 may not define an opening 136, and instead may form an enclosed bleed air flowpath 66 or cooling air flowpath 108, 110, 112, 114. In such a configuration, the core engine 16 may not include one or more of the vents 128, 130, 132.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction, the gas turbine engine comprising:
    a core engine including an outer casing;
    an engine air flowpath extending through the core engine;
    a cooling air flowpath extending outwardly generally along the radial direction between an inlet in flow communication with the engine air flowpath and an outlet defined by an opening in the outer casing of the core engine; and
    a heat exchanger positioned at least partially within the outer casing of the core engine, the cooling air flowpath extending over or through the heat exchanger.

2. The gas turbine of claim 1, wherein the core engine includes a vent over the opening in the outer casing, the vent configured to adjust an amount of airflow allowable through the cooling air flowpath.

3. The gas turbine of claim 1, wherein the heat exchanger is rigidly attached to the outer casing.

4. The gas turbine of claim 3, wherein the core engine includes an annular compressor frame positioned within the outer casing, and wherein the heat exchanger is also rigidly attached to the annular compressor frame such that the heat exchanger provides structural support between the outer casing and the annular compressor frame.

5. The gas turbine of claim 1, wherein the core engine includes a compressor section, wherein the engine air flowpath extends through the compressor section, and wherein the inlet of the cooling air flowpath is in flow communication with the engine air flowpath in the compressor section of the core engine.

6. The gas turbine of claim 1, wherein the core engine defines a plurality of bleed air flowpaths extending outwardly generally along the radial direction from the engine air flowpath through the outer casing, wherein the gas turbine engine further defines a circumferential direction, and wherein the bleed air flowpaths and the cooling air flowpath are spaced along the circumferential direction.

7. The gas turbine of claim 6, wherein the core engine includes an inner liner and an outer liner spaced from one another along the radial direction and at least partially defining the engine air flowpath, wherein the core engine also includes a pair of sidewalls extending outwardly along the radial direction from the outer liner at least partially defining the cooling air flowpath, wherein each of the sidewalls defines an opening allowing for air to flow between the cooling air flowpath and one or more of the bleed air flowpaths.

8. The gas turbine of claim 1, wherein the core engine includes an inner liner and an outer liner spaced from one another along the radial direction and at least partially defining the engine air flowpath, wherein the inlet of the cooling air flowpath is defined by an opening in the outer liner, wherein the core engine further includes a variable bleed valve door positioned over the opening in the outer liner configured to vary an amount of airflow that passes therethrough and into the cooling air flowpath.

9. The gas turbine of claim 1, wherein the heat exchanger is an air cooled oil cooler.

10. The gas turbine of claim 1, further comprising
a fan positioned in flow communication with the core engine; and
an annular fan casing surrounding the fan and at least a portion of the core engine, the annular fan casing defining a bypass passage with the outer casing of the core engine, wherein the outlet of the cooling air flowpath defined by the opening in the outer casing of the core engine opens into the bypass passage.

11. A gas turbine engine defining a radial direction and a circumferential direction, the gas turbine engine comprising:
a core engine including an outer casing and a compressor section;
an engine air flowpath extending through the compressor section of the core engine;
a plurality of bleed air flowpaths extending outwardly generally along the radial direction from the engine air flowpath;
a cooling air flowpath extending outwardly generally along the radial direction from the engine air flowpath, the cooling air flowpath and the plurality of bleed air flowpaths spaced along the circumferential direction of the gas turbine engine; and
a heat exchanger positioned at least partially within the outer casing of the core engine, the cooling air flowpath extending over or through the heat exchanger.

12. The gas turbine of claim 11, wherein the cooling air flowpath extends from an inlet in flow communication with the cooling air flowpath to an outlet defined by an opening in the outer casing of the core engine.

13. The gas turbine of claim 12, wherein the core engine includes a vent over the opening in the outer casing, the vent configured to adjust an amount of airflow allowable through the cooling air flowpath.

14. The gas turbine of claim 11, wherein the heat exchanger is rigidly attached to the outer casing.

15. The gas turbine of claim 14, wherein the core engine includes an annular compressor frame positioned within the outer casing, and wherein the heat exchanger is also rigidly attached to the annular compressor frame such that the heat exchanger provides structural support between the outer casing and the annular compressor frame.

16. The gas turbine of claim 11, wherein the compressor section of the core engine includes a low pressure compressor and a high pressure compressor, wherein the cooling air flowpath and the plurality of bleed air flowpaths extend outwardly generally along the radial direction from the engine air flowpath between the low pressure compressor and the high pressure compressor.

17. The gas turbine of claim 11, wherein the core engine includes an inner liner and an outer liner spaced from one another along the radial direction and at least partially defining the engine air flowpath, wherein the core engine also includes a pair of sidewalls extending outwardly along the radial direction from the outer liner at least partially defining the cooling air flowpath, wherein each of the sidewalls defines an opening allowing for air to flow between the cooling air flowpath and one or more of the bleed air flowpaths.

18. The gas turbine of claim 11, wherein the core engine includes an inner liner and an outer liner spaced from one another along the radial direction and at least partially defining the engine air flowpath, wherein an inlet of the cooling air flowpath is defined by an opening in the outer liner, wherein the core engine further includes a variable bleed valve door positioned over the opening in the outer liner configured to vary an amount of airflow that passes therethrough and into the cooling air flowpath.

19. The gas turbine of claim 11, wherein the heat exchanger is an air cooled oil cooler.

20. The gas turbine of claim 11, wherein the cooling air flowpath is a first cooling air flowpath, and wherein the gas turbine further comprises
a second cooling air flowpath extending outwardly generally along the radial direction from the engine air flowpath, the first and second cooling air flowpaths and the plurality of bleed air flowpaths spaced along the circumferential direction of the gas turbine engine; and
a second heat exchanger positioned at least partially within the outer casing of the core engine, the second cooling air flowpath extending over or through the second heat exchanger.

* * * * *